March 19, 1963 J. NAMISNIAK ETAL 3,081,604
CONTROL MECHANISM FOR FLUID COMPRESSION MEANS
Filed May 28, 1959 2 Sheets-Sheet 1

*INVENTOR.*
JOSEPH NAMISNIAK
BY JAMES W. ENDRESS

*Herman Seid*
ATTORNEY

United States Patent Office 3,081,604
Patented Mar. 19, 1963

3,081,604
CONTROL MECHANISM FOR FLUID
COMPRESSION MEANS
Joseph Namisniak and James W. Endress, Syracuse,
N.Y., assignors to Carrier Corporation, Syracuse, N.Y.,
a corporation of Delaware
Filed May 28, 1959, Ser. No. 816,443
6 Claims. (Cl. 62—84)

This invention relates broadly to fluid compression equipment. More particularly, this invention relates to fluid compression equipment suitable for use in a plant or facility requiring a supply of fluid under pressure. Still more particularly, this invention relates to improved control mechanism for use with fluid compression equipment of the type described.

In fluid compression equipment such as a centrifugal gas compressor, it is often desired to vary certain of the characteristics of the fluid or gas being handled by the compressor. In this regard the gas compression unit may be provided with a plurality of guide vanes positioned in the suction inlet of the machine for controlling the direction of flow of the gas into the machine. The guide vanes also have the effect of varying the capacity of the gas compression unit by limiting the amount of gas handled and are normally controlled in response to an operating characteristic of the equipment or plant of which the machine is a component. Other equipment employed for the purpose of varying the capacity of the gas compression unit includes a damper placed in the suction inlet or suction line which is actuated to vary the amount of gas.

When a centrifugal gas compressor is employed in a plant or facility which incorporates a closed circuit such as a refrigeration system, the refrigerant gas is pumped by the centrifugal compressor from the suction side of the machine to the discharge side of the machine. As indicated above, the capacity of the compressor is varied by appropriate adjustment of the guide vanes or damper which are positioned as indicated above. The mechanism for adjusting the guide vanes or damper is usually under the control of means responsive to the load imposed on the machine. In the organization described where relatively high pressure refrigerants are employed, a problem exists when the operation of the machine is terminated. The relatively high pressure gas which exists at shutdown in the discharge side of the machine has a tendency to flow in a reverse direction through the compressor causing the impellers to reverse their normal direction of rotation and create abnormal forces on the thrust bearings and the like which support the shaft, which, in turn, mounts the impellers. Damage may also occur to the impeller or impellers by virtue of the excessive overspeed in the direction of movement opposite that for which the impeller is designed. In the past it has been proposed that various mechanisms be provided to insure positioning of the guide vanes at the inlet of the compressor in such a manner that reverse flow of the type described, through the compressor, is prevented. In other words, mechanism has been provided for positioning the guide vanes in such a manner that maximum resistance to the flow of gas by the vanes is offered during the time that the machine is shut down.

One of the arrangements usually employed to maintain the positioning of the guide vanes in the manner described above involves utilizing vane-closing mechanism, the operation of which is under the control of pressure exerted by the lubricant flowing within the lubrication system of the compressor. Such an arrangement has been found to be impractical under those circumstances where relatively high pressure gas is used in the machine for the reason that the gas in the discharge line at the time termination of operation of the machine occurs is under a pressure great enough to overcome the action of the mechanism controlled by the pressure generated by the lubrication system and thus cause damage to the machine described above. Another disadvantage of employing pressure developed within the lubrication system to maintain the capacity control mechanism in its closed position upon termination of operation of the compressor when high pressure gas is being discharged is apparent when it is realized that the time interval after the compressor has been stopped in which the gas starts to reverse its flow is often shorter than the time required to apply the lubricant pressure to a control piston in a hydraulic system of the kind used to close the capacity control mechanism.

The chief object of this invention is the provision of an improved guide vane or damper control mechanism for a fluid compressor of the type described wherein control of the mechanism is under the influence of a criterion other than the lubrication pressure developed within the machine or any other external influence.

Another object of the invention is the provision of an improved guide vane control mechanism which is operable in response to a condition within the facility which includes the compressor as a component which will positively assure a closed position for the guide vanes upon termination of the operation of the equipment.

Another object of the invention is the provision of an improved guide vane control mechanism which is operable in response to a condition within the facility which includes the compressor as a component which will positively assure a closed position for the guide vanes upon termination of the operation of the equipment within sufficient time to limit or eliminate damage to the equipment.

A still further object of the invention is an improved method of controlling the operation of guide vanes or damper associated with fluid compression equipment.

The above-mentioned objects are attained by the provision of a guide vane or damper control mechanism responsive at the termination of operation of the unit served by the guide vanes to the pressure of the gas delivered by the gas compressor.

Other objects and features of the invention will be apparent upon a consideration of the ensuing specification and drawings in which.

Figure 1:
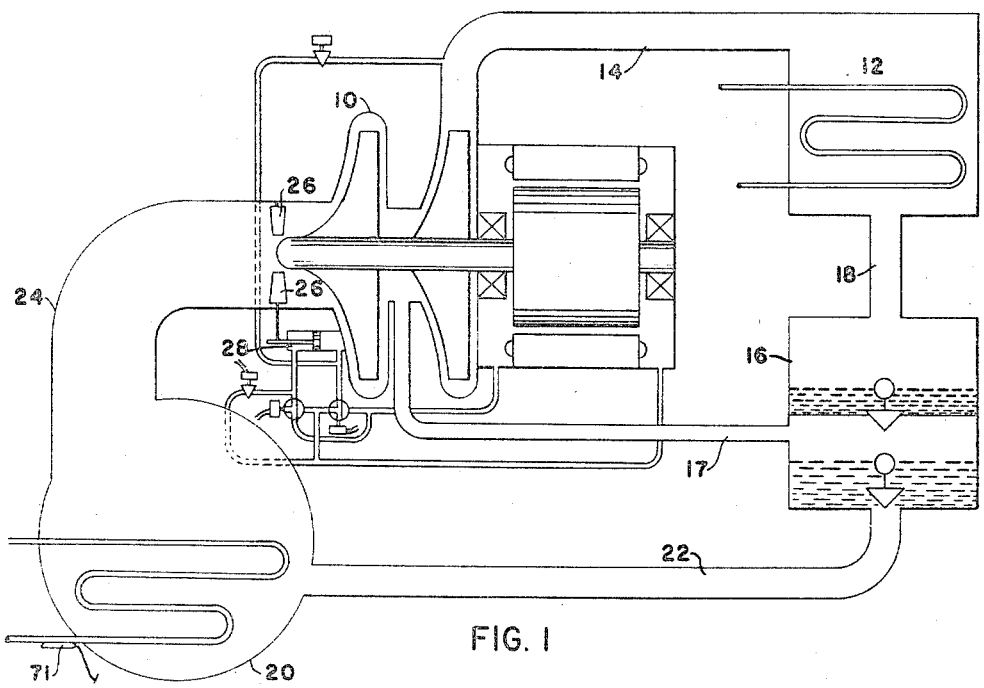
FIGURE 1 is a diagrammatic view of a refrigeration system equipped with a gas or fluid compressor having a guide vane control forming the subject of this invention.

For the purpose of describing the invention, a fluid compressor such as a centrifugal gas compressor is illustrated in conjunction with a refrigeration system shown diagrammatically in FIGURE 1.

In the refrigeration system illustrated in FIGURE 1, a motor driven centrifugal gas compressor 10 operates to discharge refrigerant gas under pressure to a condenser 12 through a discharge line 14. From the condenser, liquefied refrigerant flows through line 18 to economizer 16. In the economizer, portions of the liquid refrigerant are vaporized as they enter a zone of relatively lower pressure and flow through line 17 to the compressor at an intermediate stage of compression. The remaining liquid refrigerant in the economizer is directed to the evaporator 20 through liquid line 22. Appropriate float valves control outlets from the and within the economizer so that the desired pressure drop necessary to create the refrigerating effect in the evaporator is provided. Liquid refrigerant is evaporated in the evaporator 20 and flows in the gaseous state through the suction line 24 to the inlet of the compressor.

Figure 2:
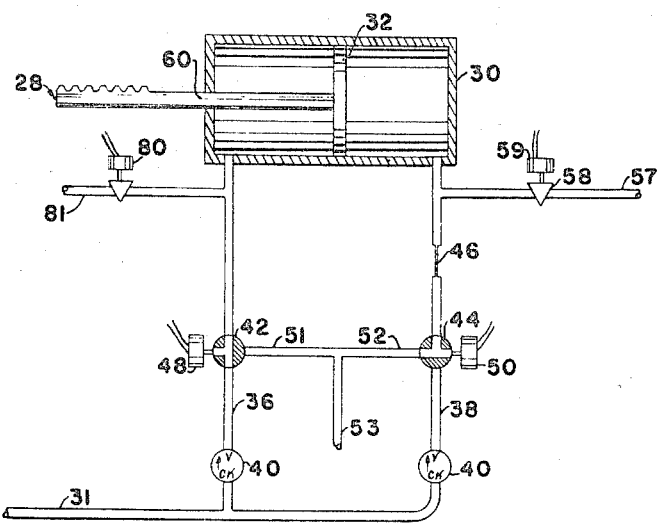
FIGURE 2 is a diagrammatic view of a portion of the control system forming the subject of this invention.

As is common in apparatus of this type, a series of circumferentially spaced guide vanes 26 is arranged about the inlet of the compressor and is provided with operating mechanism 28 for the purpose of rotating the guide vanes in order to vary the area of the opening provided to the suction of the compressor and thus vary the capacity of the compressor. The operating mechanism includes appropriate pulley and cable arrangements, not shown, arranged so that movement provided to a single vane known as the control vane is imparted in turn to each of the other vanes arranged about the inlet of the compressor. Included in the operating mechanism generally described is a control cylinder 30 having a piston 32 which moves within the control cylinder under the influence of oil pressure developed in the machine by the lubricating pump. It will be appreciated that compressors of this type which include rotating impellers supported on a shaft require seals and bearings which in turn are lubricated with the assistance of a lubrication circuit including a pump deriving its power from the main shaft of the compressor or other means. The portion of the lubrication circuit which includes the control cylinder 30 is shown in FIGURE 2 and includes a supply line 34 and branch lines 36 and 38 which are connected respectively with the forward and rearward ends of the control cylinder. Check valves 40 are likewise provided within the branch lines 36 and 38. In order to control the direction of the application of oil pressure to the piston in the control cylinder, three-way control valves 42 and 44 are provided. It is likewise preferable to include a restrictor 46 for the purpose of providing a substantially constant rate of flow of lubricant to the control cylinder. Suitable linkage for the purpose of converting the linear movement of the piston 32 to rotational movement connects the shank extending from the piston to the control guide vane. The shank 60 functions in effect as a rack and meshes with segmental gear 61 keyed to the bottom portion of rod 63. A second segmental gear 64 is rigidly secured to the top portion of rod 63 and meshes with gear 65 on the shank of control vane 66.

The three-way control valves 42 and 44 operate under the influence of solenoid valves 48 and 50, respectively. The three-way control valves, in addition to regulating flow in the branch lines 36 and 38, also provide connections to drain lines 52 and 51 which, in turn, are connected to a common outlet line 53. The latter line connects directly to the sump in the compressor where the lubricant tends to collect. Included in the branch line 38 is a connection to a line 57 which communicates with the discharge line 14. Flow of gaseous refrigerant in this line is under the control of a valve member 58.

Solenoid 59 regulating valve 58 is controlled in conjunction with the main control switch for the prime mover of the compressor in such a manner that it is energized so as to maintain valve 58 closed during operation of the compressor but is deenergized when the compressor prime mover is inactivated so as to open valve 58. Thus in the latter event discharge gas is introduced into the control cylinder causing the piston to move in a direction to close the guide vanes. Solenoids 48 and 50 activating control valves 42 and 44, respectively, are also deenergized as the prime mover is inactivated to prevent flow through line 52 to the common outlet 53. Similarly, line 51 is opened permitting flow therethrough to the common drain 53 from the control cylinder 30.

Figure 3:
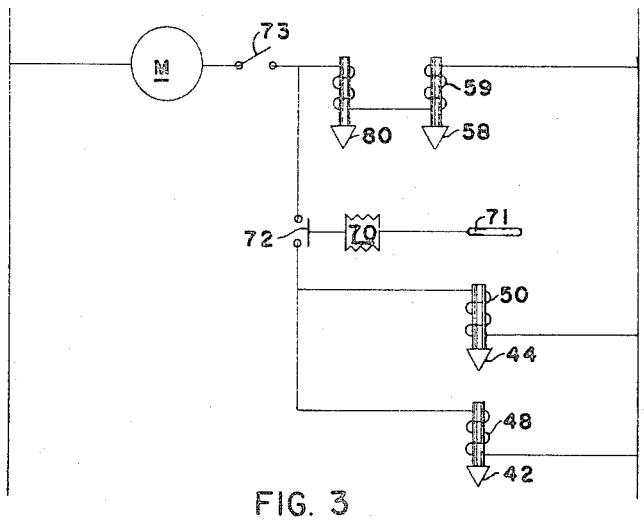
FIGURE 3 is a partial view of the electrical circuit employed in the improved guide vane control mechanism disclosed herein.
Figure 4:
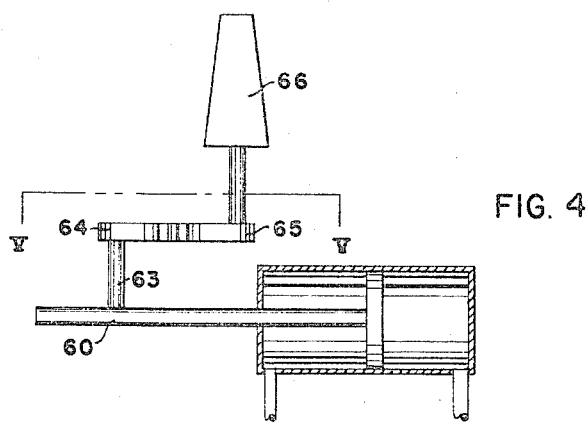
FIGURES 4 and 5 are schematic views of an arrangement for connecting certain of the elements of the control forming the subject of the invention with FIGURE 5 being a partial view taken along lines 5—5 on FIGURE 4.
Figure 5:
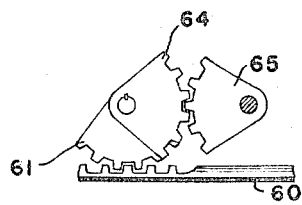

Considering the operation of the apparatus forming the subject of this invention, normal operation of the refrigeration machine involves operation of the compressor under circumstances where the load on the compressor as measured by the temperature of the medium being cooled in the evaporator is equated automatically through the operation of the guide vanes or damper to the capacity of the compressor. Referring more particularly to FIGURES 2 and 3, it will be observed that under those circumstances where the temperature of the medium being cooled in the evaporator is above a predetermined design point a circuit is made through the coils controlling the solenoids 48 and 50. Under these circumstances the three-way valve 42 is indexed so as to permit lubricant flowing under lubrication system pressure to be introduced into the control cylinder in such a manner as to cause the piston to move to the right, as viewed in FIGURE 2. At the same time the three-way valve 44 is positioned so as to permit drainage of lubricant from the opposite side of the piston through the drain line 52 to the outlet line 53. This has the effect of opening the guide vanes causing the capacity of the compressor to be increased. Eventually the temperature of the medium being cooled in the evaporator will be reduced to the design temperature. Further reduction of the temperature is sensed by bulb 71 which causes a bellows member 70 controlling switch 72 to open a circuit through the coils of solenoids 50 and 48. This has the effect of indexing the three-way valve 44 wherein lubrication system pressure is applied to the side of the piston in communication with branch line 38. At the same time the three-way valve 42 is indexed so as to permit the drainage of fluid on the opposite side of the piston through the branch line and associated drain line 51 to the outlet line 53. Movement of the piston to the left of the cylinder as viewed in FIGURE 2 then occurs. This has the effect of causing the guide vanes to move toward a more closed position which, in turn, decreases the capacity of the compressor and more equally balances the capacity of the compressor to the load imposed on the machine.

As pointed out above, in the past the guide vane or damper control system described above has been operable so as to cause the piston to move to the left of the cylinder when the equipment has been shut down. When high pressure refrigerants are employed in the system, the gas as it flows in a reversed direction through the compressor causes rotation of the shaft mounting the impellers in a direction reverse to that for which it is desired. The time interval, after inactivating the compressor prime mover for reverse rotation to start varies with the mass inertia of the compressor and prime mover, but in every case it is a relatively short period of time, normally 2 to 6 seconds. As the rate at which the control piston 32 will close the guide vanes 26 upon inactivation of the compressor prime mover is dependent upon the supply of oil delivered to the cylinder 30 closing will not be effective if sufficient oil is not available to reposition the pistons, or the oil system has been inactivated at the time the compressor prime mover was inactivated or due to failure of the lubricating system. It is reasonable, therefore, to use the high pressures, created during normal operation of the compressor, to effect closing of the guide vanes, or damper, in sufficient time to prevent reverse rotation of the compressor. The pressure in the discharge line is of sufficient magnitude to provide force in excess to any developed by the lubricating system and thus assure closing of the guide vanes.

In the control arrangement described above, the switch 73 controlling operation of the compressor prime mover is a single-pole, single-throw switch designed to open a circuit through the coil 59 of the solenoid-controlling valve 58 when the circuit through the compressor prime mover is interrupted. Thus a source of high pressure refrigerant is applied directly to the face of the piston in the control cylinder 30 causing the piston to move to the left. The high pressure refrigerant provides a force for maintaining the guide vanes in a closed position which is of a magnitude sufficient to resist any force tending to open the guide vanes or retard their movemnet. To assure proper drainage of any lubricant that may be trapped in the area to the left of the piston 32 in the cylinder 30, valve 80 opens to cause vent line 81 to drain to the sump. The valve 80 and line 81 may not be necessary if valve 42 normally opens to the drain when solenoid 48 is deenergized and is of sufficient capacity and size to permit flow of the lubricant to the sump.

While we have described a preferred embodiment of our invention, it will be understood our invention is not limited thereto since it may be otherwise embodied within the scope of the following claims.

We claim:

1. A refrigeration machine comprising a centrifugal compressor having a lubrication system incorporated therein, a condenser, a discharge line connecting the compressor and the condenser, an expansion member, an evaporator, a suction line connecting the evaporator and the compressor, means positioned in said suction line for varying the direction of the flow of refrigerant gas to the compressor, means for controlling operation of said first-mentioned means, said controlling means including mechanism governing movement of said first-mentioned means, an operating element responsive, upon termination of compressor operation, to condenser pressure for causing said mechanism to actuate the first-mentioned means to a position offering maximum resistance to the flow of gaseous refrigerant.

2. In a fluid compression system including a fluid compressor and capacity control means varying the amount of fluid flowing into the compressor, means for regulating the operation of said capacity control means and means operable upon termination of the compressor for positioning said capacity control means to offer maximum resistance to the flow of fluid through the compressor, said last-mentioned means including mechanism for utilizing fluid under pressure developed by the compressor.

3. In a refrigeration machine including a motor-driven compressor having a lubrication system, a condenser, expansion means and an evaporator connected to form a closed circuit for the flow of refrigerant, control means for varying the capacity of the compressor, means for regulating the capacity control means and means operable upon termination of the operation of said compressor for assuring positioning of said capacity control means to offer maximum resistance to the flow of gas through the compressor.

4. The invention set forth in claim 3 wherein said last-mentioned means includes mechanism for applying condenser gas to the regulating means.

5. The method of operating a refrigeration machine including a compressor having a lubrication system, a condenser, an expansion member, an evaporator, a suction line connecting the evaporator and the compressor, and adjustable flow diverting means positioned in the suction line which consists in the steps of utilizing the pressure of the lubricant in the lubrication system to vary the position of flow diverting means substantially in accordance with the refrigerating requirement on the machine and employing condenser pressure to assure positioning of the flow diverting means so as to offer maximum resistance to the flow of refrigerant upon termination of the operation of the compressor.

6. In a fluid compression system including a compressor, discharge line and guide vanes positioned in the stream of fluid in advance of the compressor, mechanism for positioning said guide vanes to provide maximum resistance to the flow of fluid through the compressor upon termination of operation of the compressor, said mechanism including guide vane actuating means, means employing the discharge gas of the compressor to directly control the actuating means, and flow regulating means operable upon the termination of operation of the compressor to provide communication between the guide vane mechanism and the discharge line.

References Cited in the file of this patent

UNITED STATES PATENTS

| | | |
|---|---|---|
| 2,339,150 | Codrington | Jan. 11, 1944 |
| 2,351,203 | Hanson | June 13, 1944 |
| 2,360,386 | Young | Oct. 17, 1944 |
| 2,581,956 | Jones | Jan. 8, 1952 |
| 2,613,029 | Wilde | Oct. 7, 1952 |
| 2,638,265 | Newton | May 12, 1953 |
| 2,734,346 | Dickieson | Feb. 14, 1956 |
| 2,817,213 | Miner | Dec. 24, 1957 |